(12) United States Patent
Drake et al.

(10) Patent No.: US 6,501,595 B1
(45) Date of Patent: Dec. 31, 2002

(54) OPTICAL AMPLIFIER PUMP CONTROL

(75) Inventors: Jonathan Drake, Devon (GB); Jonathan W Gill, Devon (GB); James Regan, Devon (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/539,126

(22) Filed: Mar. 30, 2000

(51) Int. Cl.[7] ................................................. H01S 3/00
(52) U.S. Cl. ................................................. 359/341.43
(58) Field of Search ........................ 359/341.43, 341.41, 359/341.3

(56) References Cited

U.S. PATENT DOCUMENTS 5,892,616 A * 4/1999 Takahashi .................... 359/341
5,986,799 A * 11/1999 Itou et al. .................... 359/337
6,078,422 A * 6/2000 Kosaka et al. ............... 359/341

* cited by examiner

Primary Examiner—Mark Hellner
(74) Attorney, Agent, or Firm—Lee, Mann, Smith, McWilliams, Sweeney & Ohlson

(57) ABSTRACT

An optical amplifier comprises a doped fiber and a pump source for providing pump light to the fiber. A power measurement circuit is provided for measuring the output power of the amplifier and a disable circuit is controlled to disable the pump source in response to the output power of an output pulse exceeding a predetermined limit. In this way, power surges can be avoided. Preferably, the predetermined limit takes into account the duration of the output pulse, so that the disable circuit can be tailored to pulse power versus pulse duration standardised limits.

12 Claims, 3 Drawing Sheets

OPTICAL AMPLIFIER PUMP CONTROL

FIELD OF THE INVENTION

This invention relates to optical communications systems and, more particularly, a pump control system for optical amplifiers for use in such systems.

BACKGROUND OF THE INVENTION

Large capacity optical transmission systems typically combine high speed signals on a signal fiber by means of Wavelength Division Multiplexing (WDM) to fill the available bandwidth. In these WDM optical transmission systems, in general, rare-earth doped fiber optical amplifiers (such as Erbium or Erbium-Ytterbium doped) are used to compensate for the fiber link and splitting losses. Such amplifiers are provided with laser pump light to cause the optical amplification.

As the number of channels increases, the maximum output power requirements increase. There are various regulations concerning the maximum allowable power outputs for different classes of amplifier, and these different classes of amplifier require different safety measures. There is therefore a need to ensure that maximum power requirements are satisfied so that a particular amplifier can achieve a given classification.

Automatic gain control (AGC) schemes are well known, which maintain a constant gain, regardless of the number of channels present at the input. This overcomes the problem of gain transients, which occur when channels are added or dropped either due to network reconfiguration or failures. Adding channels can depress the power of the present channels below the receiver sensitivity. Dropping channels can give rise to error events in the surviving channels because the power of the surviving channels can surpass the thresholds for non-linear effects. The error bursts in the surviving or present channels as a result of these power transients are unacceptable to service providers. Various other factors also give rise to gain modulation, causing non-uniform amplifier gain.

Automatic gain control requires rapid gain control to respond to channel adding and dropping at the input, without giving rise to large or prolonged gain transient effects. Automatic gain control (AGC) is typically in the form of optoelectronic or all optical feedback loops for controlling the laser pump source to provide a required change in amplifier pumping. AGC schemes may use feedforward or feedback loops, or a combination of these, in order to derive control signals from measures of input and output powers so as to increase the amplifier pump power when more output power is required.

It is also known to provide a series of so-called concatenated amplifier stages within a single optical amplifier. Each stage has its own associated doped fiber section and pump sources. For each individual stage, the noise performance is improved for higher power operation. With this in mind, it has been recognised that the first stage within such an amplifier should be operated at the highest possible power, so that the noise introduced by the first stage, and which is amplified by subsequent stages, is kept to a minimum. Such an arrangement provides that the first stage of the optical amplifier always contributes to the output power of the amplifier.

SUMMARY OF THE INVENTION

According to the invention, there is provided an optical amplifier comprising:

a doped fiber and a pump source for providing pump light to the fiber;

a power measurement circuit for measuring the output power of the amplifier; and a disable circuit for disabling the pump source in response to the output power of an output pulse exceeding a predetermined limit.

The invention provides an amplifier in which a disable function is provided, so that power surges can be avoided. Preferably, the predetermined limit takes into account the duration of the output pulse, so that the disable circuit can be tailored to pulse power versus pulse duration standardised limits.

For example, the disable circuit may implement a desired relationship between pulse duration and maximum pulse power, wherein the maximum pulse power is, for all pulse durations, below a predetermined pulse power classification. This classification may comprise the 3A optical amplifier classification.

The amplifier may comprise at least first and second amplifier stages, wherein the disable circuit is for disabling the pump source of at least the first amplifier stage. For all levels of gain of the amplifier, the pump source of the first amplifier stage may be operated to provide signal gain. A differential pump drive scheme can reduce noise in the amplifier, and in this way, linking the disable function to the first amplifier stage will always provide a reduction in output power.

The power measurement circuit is preferably also for measuring the input power of the amplifier; and a driver circuit is provided for generating pump control signals for controlling the pump source of each amplifier stage in dependence on the input and output power in order to maintain a substantially constant gain.

Preferably, the disable circuit comprises an integrator for integrating the output power pulse and a comparator for comparing the integrated output power pulse with a threshold level.

The invention also provides an optical communications system comprising a transmitter and a receiver connected together by an optical fiber link, the optical fiber link including at least one amplifier according to the invention.

The invention also provides a method of controlling an optical amplifier comprising a doped fiber, a pump source for providing pump light to the fiber and a power measurement circuit for measuring the output power of the amplifier, the method comprising disabling the pump source in response to the output power of an output pulse exceeding a predetermined limit.

BRIEF DESCRIPTION OF THE DRAWINGS

An example of the invention will now be described in detail with reference to the accompanying drawings, in which.

DETAILED DESCRIPTION

Figure 1:
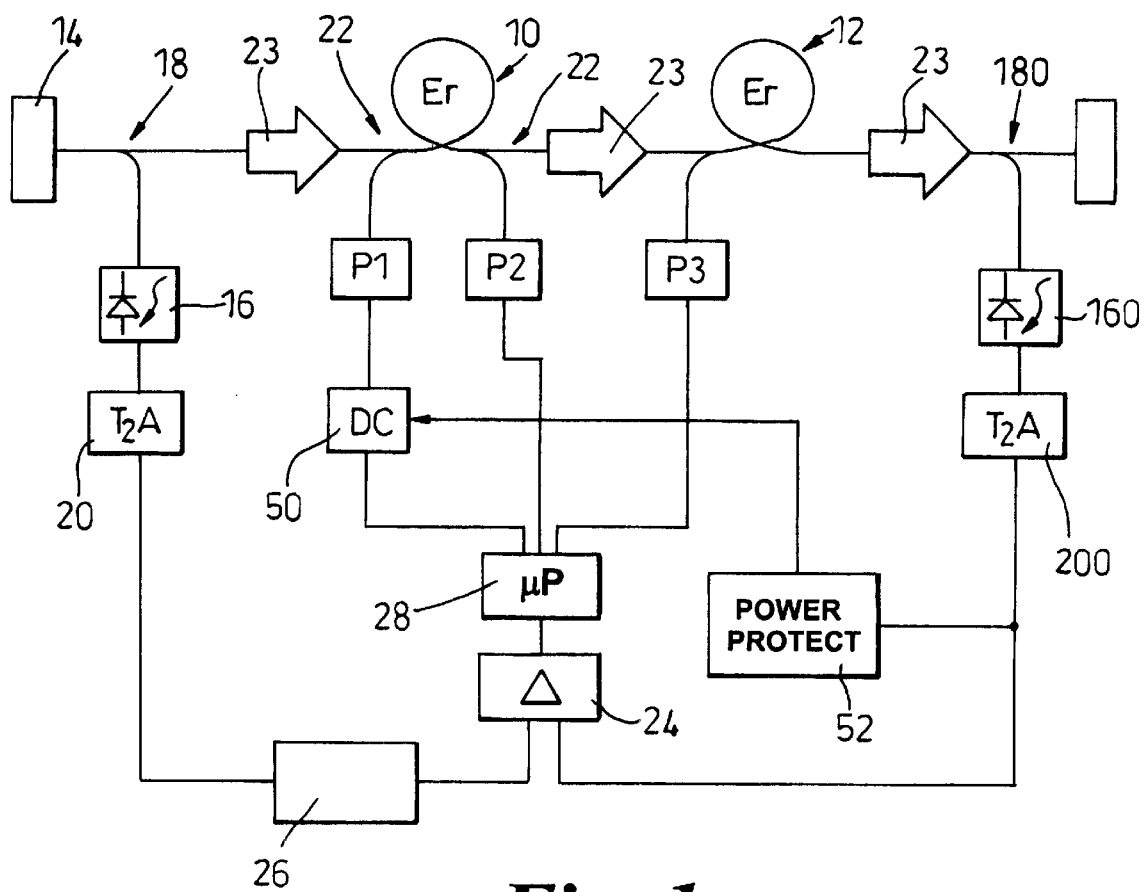
FIG. 1 shows a multi-stage Erbium doped fibre amplifier (EDFA) of the invention.

FIG. 1 shows a multi-stage erbium doped fiber amplifier with automatic gain control and having pump control in accordance with the invention. The amplifier has two stages comprising erbium-doped fibers 10 and 12. An input to the amplifier 14 normally comprises a plurality of wavelength division multiplexed channels. The input power applied to the amplifier is measured using a photo detector 16, which receives a proportion of the input signal which is tapped off the main input line using a tap coupler 18. The photodiode 16 is responsive to the duration and intensity of optical pulses at the input and generates an output current. This is converted by a transimpedance amplifier 20 into a voltage representing the power of the optical pulses at the input. A similar power measurement circuit is provided at the output of the amplifier, again comprising a photodiode 160, a tap coupler 180 and a transimpedance amplifier 200.

In the example shown in FIG. 1, the first amplifier 10 is co-pumped and counter-pumped, by pump sources $P_1$ and $P_2$, respectively. The pump light is generated by laser diodes, at a number of possible wavelengths, for example 980 nm or 1480 nm. For example, the co-pump source $P_1$ may comprise a 980 nm laser diode, whereas the counter-pump source $P_2$ may comprise a 1480 nm laser diode. In the example shown in FIG. 1, the second amplifier 12 is provided only with a co-pumping source $P_3$.

In each case, the pump power is introduced to the optical fiber line using a fused fiber wavelength division multiplexer 22. Optical isolators 23 are provided between the stages and at the input and output of the amplifier. The isolators prevent the passage of backward-propagating ASE.

The measured input and Output powers are supplied to a circuit 24 for deriving an error signal. This circuit 24 receives a target output power from a power calculating circuit 26, which calculates the desired output power based on the measured input power and the desired gain of the amplifier. Essentially, the input power is multiplied by the desired gain, and an ASE compensation factor is added. This gives the output power which is required to achieve the desired level of signal gain. The purpose of the amplifier control system is to maintain a substantially constant gain.

The circuit 24 derives an error between the target output power and the measured output power, and this error signal is used to control the pump sources $P_1$ to $P_3$ to alter the amplifier pumping conditions to achieve the required gain.

Changes in the pumping conditions may be required in response to changes in the input signal, for example in response to the adding or dropping of WDM channels. The error signal is supplied to a processor 28 which calculates a target pump level for the system, this target pump level being used to drive the three laser diode pump sources $P_1$ to $P_3$.

FIG. 1 shows a separate microprocessor 28 output for each laser diode pump P1 to P3. It is preferred that the microprocessor implements independent pump control, particularly to reduce the propagation and amplification of noise throughout the system. One possible pump drive scheme is represented in FIG. 2, which provides independent pump control.

Figure 2:
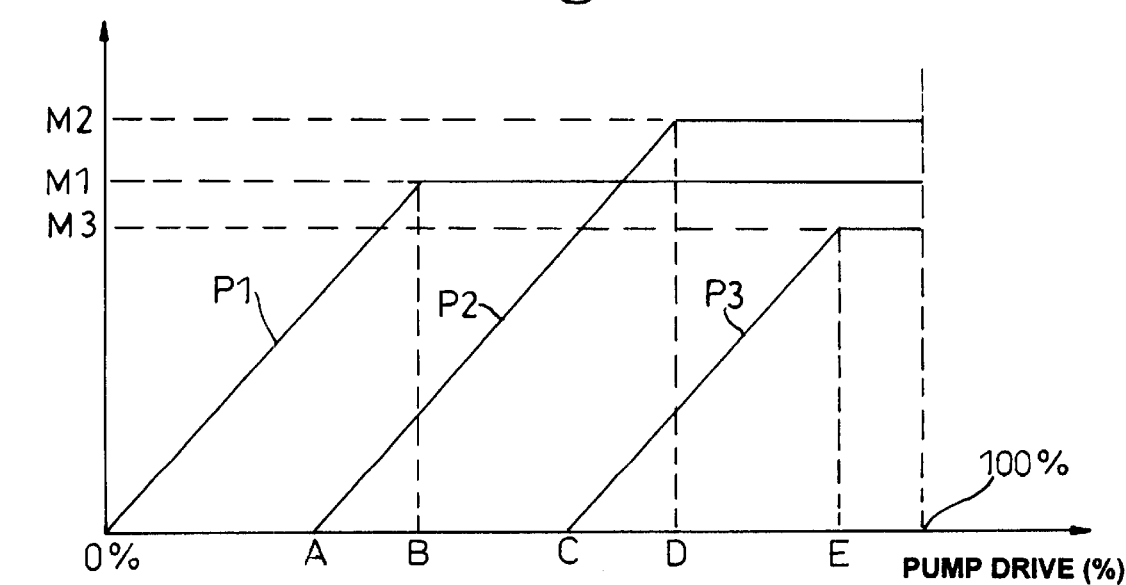
FIG. 2 shows in greater detail the disable circuit used in the amplifier of FIG. 1.

FIG. 2 shows one possible scheme of laser diode pump current versus an overall pump drive level required by the amplifier, to achieve the desired constant gain. If noise is introduced by one of the first amplifier stages, this introduced noise becomes amplified in the following stages. Therefore, it is desirable to reduce to a minimum the noise introduced at the input end of the amplifier. Low inversion is achieved in an optical amplifier, giving rise to a poor optical noise figure, when the amplifier is operated at low power levels. Consequently, the power from the first pump should be kept at a high level to maintain a low noise figure. At low gain or output settings the pump power in subsequent pumps may be small or zero, so that all output power control is effected by control of the first pump in the chain.

As shown in FIG. 2, when the amplifier requires only a small amount of pump signal to achieve the required gain, this is achieved by means only of the first laser diode pump source $P_1$. Thus, between levels 0 and A the laser diode pumps $P_2$ and $P_3$ are turned off. At point A the counter-pump $P_2$ is also introduced. This is before the first pump source $P_1$ has reached its maximum level $M_1$, because some overlap is required to take account of threshold changes of the laser diode pump sources over time. Similarly, before the second laser diode pump source $P_2$ has reached its maximum level $M_2$, the third pump source $P_3$ is introduced, at point C.

The pump control scheme implemented by FIG. 2 maps from a general pump drive level to individual pump source levels. Different general pump drive levels result in different combinations of the pump sources being active. However, in order to reduce the noise amplified by the system, the first pump source is always activated.

The invention is concerned specifically with a pump control scheme which avoids system overload. As shown in FIG. 1, the amplifier of the invention includes a disable circuit 50 for disabling the pump source $P_1$ of at least the first amplifier stage 10. The output power measured by the amplifier 200 is provided to a power protection circuit 52, which controls the operation of the disable circuit 50. The disable circuit is shown disposed between the pump control signal line from the processor 28 and the laser diode pump $P_1$.

Of course, all pumps may instead be disabled by the circuit 50, and the invention may also be applied to a single-stage optical amplifier. The circuit 50 operates to turn on a transistor, which shorts the laser diode anode and cathode to switch off the pump current.

Figure 3:
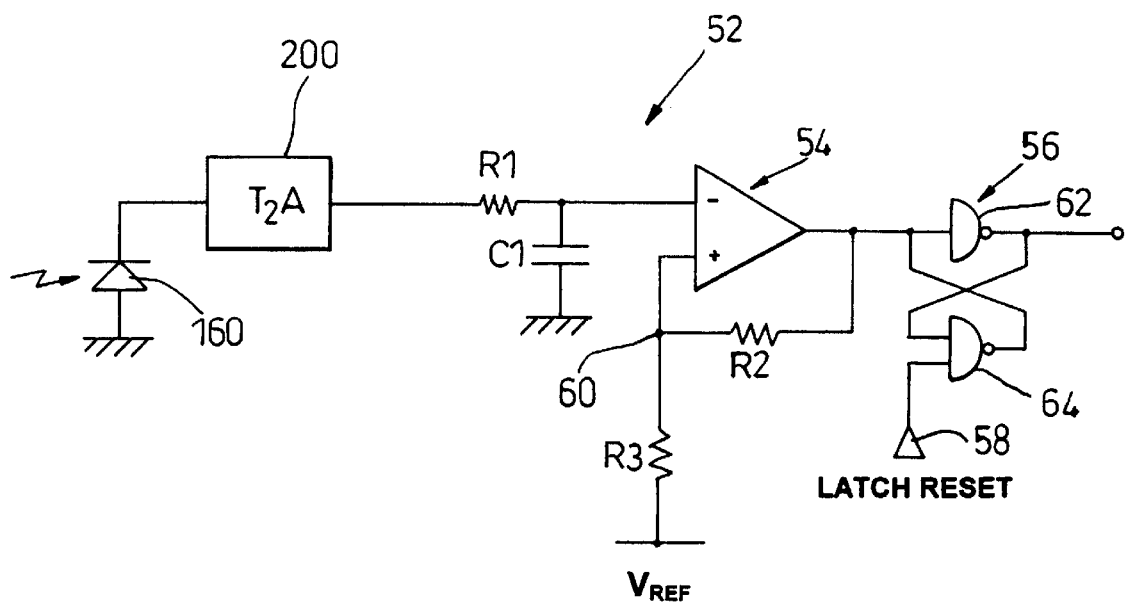
FIG. 3 shows the disable function performed by the disable unit.

FIG. 3 shows the power protect circuit 52 in greater detail. The power signal from the amplifier 200 is provided to the input of an operational amplifier through a resistor-capacitor filter arrangement R1, C1. This arrangement charges at a rate dependent on the time constant R1.C1 and on the voltage level at the input. In this way, the voltage at the input of the amplifier is dependent both on signal duration as well as signal strength. The amplifier acts as a comparator, and has positive feedback, so that the amplifier operates in saturation. The output of the amplifier is thus effectively a digital signal. The voltage on the non-inverting input of the amplifier is defined by a potential divider comprising resistors R2 and R3 coupled to a reference voltage source $V_{REF}$.

The time constant R1.C1 of the circuit dictates the dependency of the circuit on the pulse duration, whereas the resistors R2, R3 and the reference voltage $V_{REF}$ dictate the input threshold level at which the comparator toggles from one output to the other. The threshold level $V_{REF2}$ is the voltage at node 60 defined by the potential divider R2, R3. The time constant R1.C1 may be approximately 5 s.

A low output of the amplifier indicates that the input pulse duration and size results in the threshold being exceeded, so that the voltage on the inverting input exceeds the voltage on the non-inverting input, indicating an undesirable power surge in the amplifier output. This low output signal is passed through a latch having a reset port 58. The latch comprises two NAND gates 62, 64.

The output of the latch 56 goes high in response to a power exceeding pulse causing the input to go low. The latch reset signal is normally high. Once a power surge signal has caused a high signal to be latched to the output, the output can only then return to the non-failure low state with the latch reset signal going low and the input signal going high. In other words, the power surge must have ended and the latch reset must be activated.

Figure 4A:
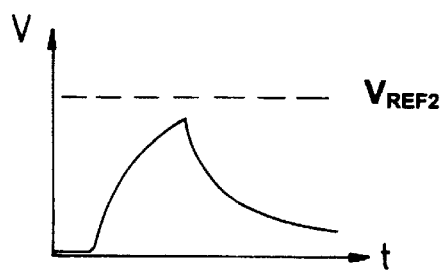
FIG. 4A shows voltage at the non-inverting amplifier input in response to an input pulse which does not exceed power requirements.
Figure 4B:
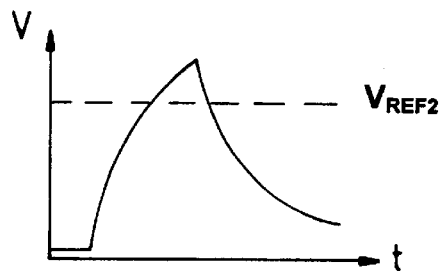
FIG. 4B shows the voltage at the non-inverting amplifier input in response to an input pulse which does exceed power requirements.

FIG. 4A shows the voltage at the non-inverting amplifier input in response to an input pulse which does not exceed the power requirements. In this case, the signal fails to reach the threshold required for the amplifier output to toggle from the saturated high output to the saturated low output. FIG. 4B shows the voltage at the non-inverting amplifier input in response to an input pulse which does exceed the power requirements.

Figure 5:
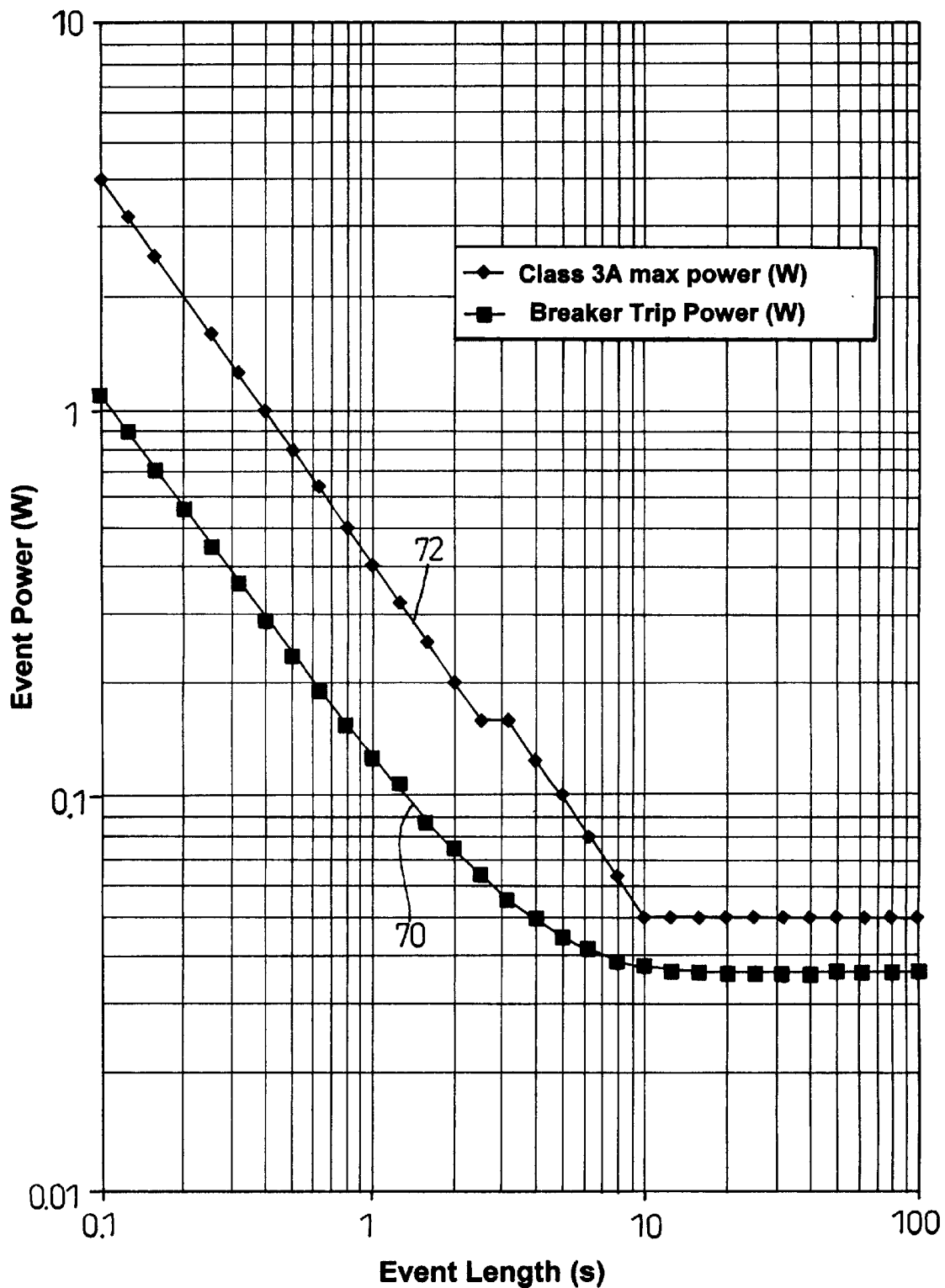
FIG. 5 shows a plot of an input pulse which is just sufficient to cause the amplifier to toggle.

FIG. 5 shows as plot 70 the characteristics of an input pulse which is just sufficient to cause the amplifier to toggle. The power required to cause toggling is a function of the pulse duration, and as shown, as the pulse duration (Event Length) increases, the required power level (Event Power) decreases. The power reaches a plateau at a pulse duration of around 10 s.

The shape of the plot 70 is a function of the R1.C1 time constant and the threshold voltage $V_{REF2}$. For a given resistor configuration R2, R3, the threshold voltage $V_{REF2}$ can be adjusted by varying the reference voltage $V_{REF}$.

Plot 72 shows the maximum allowable output power profile for an amplifier to satisfy the IEC Class 3A requirements. To ensure that a particular amplifier design satisfies these requirements, (instead of the Class 3B requirements) the profile 70 is selected to lie below the plot 70 by a selected tolerance. Class 3B amplifiers require interlocking devices to prevent human exposure to the power. The IEC Class 3A requirements dictate a maximum power of less than 50 mW for durations over 10 s, as can be seen from plot 72.

High power pulses of short duration are permitted, as these are inevitable when channels are added or dropped within WDM systems, giving rise to gain transient power dumping effects.

The gain control loop is intended to provide gain control which limits the output power to the desired limits. However, the system of the invention provides protection in the event of failure of the primary gain control system. Furthermore, the laser diode current performance is known to deteriorate over time. As a result, in order to ensure that system power requirements can be satisfied over time, laser diodes are selected which, at the beginning of their use, can provide outputs which far exceed the requirements of the system. System overloads are more likely to result during this time.

The threshold voltage $V_{REF2}$ is calibrated during manufacture of the amplifier to provide the desired level of steady state power protection, for example 40 mW (i.e. below the Class 3A 50 mW limit). The protection circuit of the invention may however be calibrated to ensure compliance with any given maximum output power characteristics.

The invention may be used to supplement any existing form of gain control scheme or output power control scheme, not only the specific example set out schematically in FIG. 1.

We claim:

1. An optical amplifier comprising:

a doped fiber and a pump source for providing pump light to the fiber;

a power measurement circuit for measuring the output power of the amplifier; and a disable circuit for disabling the pump source in response to the output power of an output pulse exceeding a predetermined limit.

2. An optical amplifier according to claim 1 comprising at least first and second amplifier stages, wherein the disable circuit is for disabling the pump source of at least the first amplifier stage.

3. An amplifier according to claim 1, wherein the predetermined limit takes into account the duration of the output pulse.

4. An amplifier according to claim 1, wherein the power measurement circuit is also for measuring the input power of the amplifier; and wherein a driver circuit is provided for generating pump control signals for controlling the pump source of each amplifier stage in dependence on the input and output power in order to maintain a substantially constant gain.

5. An amplifier according to claim 4, wherein for all levels of gain of the amplifier, the pump source of the first amplifier stage is operated to provide signal gain.

6. An amplifier according to claim 1, wherein the doped fibre comprises an Erbium doped optical fiber.

7. An amplifier according to claim 1, wherein the disable circuit comprises an integrator for integrating the output power pulse and a comparator for comparing the integrated output power pulse with a threshold level.

8. An amplifier according to claim 7, wherein the disable circuit implements a desired relationship between pulse duration and maximum pulse power, wherein the maximum pulse power is, for all pulse durations, below a predetermined pulse power classification.

9. An amplifier according to claim 8, wherein the predetermined pulse power classification comprises the IEC Class 3A optical amplifier classification.

10. An amplifier according to claim 1, wherein the pump source comprises a laser diode, and the disable circuit comprise a transistor for shorting the laser diode.

11. An optical communications system comprising a transmitter and a receiver connected together by an optical fiber link, the optical fiber link including at least one amplifier according to claim 1.

12. A method of controlling an optical amplifier comprising a doped fiber, a pump source for providing pump light to the fiber and a power measurement circuit for measuring the output power of the amplifier, the method comprising disabling the pump source in response to the output power of an output pulse exceeding a predetermined limit.

* * * * *